June 18, 1957     O. H. COPE     2,796,042

BATHING DEVICE FOR BIRDS

Filed March 12, 1956

INVENTOR

OLIVER HAROLD COPE

BY *Oliver Harold Cope*

ATTORNEY

United States Patent Office 2,796,042
Patented June 18, 1957

2,796,042

BATHING DEVICE FOR BIRDS

Oliver Harold Cope, Los Angeles, Calif., assignor to Gene W. Sidwell and Charles H. Cope, Los Angeles, Calif.

Application March 12, 1956, Serial No. 570,984

1 Claim. (Cl. 119—1)

Certain bird species, such as mocking birds, doves, pigeons, and others, bathe naturally in a pool of water. However, certain birds, such as canaries, parakeets, and others, do not bathe.

The present invention is primarily directed to a device which induces a normally non-bathing bird to enter water and to bathe.

The invention is inexpensive in cost of manufacture, attractive in appearance, and efficient for the purpose intended.

Figure 1:
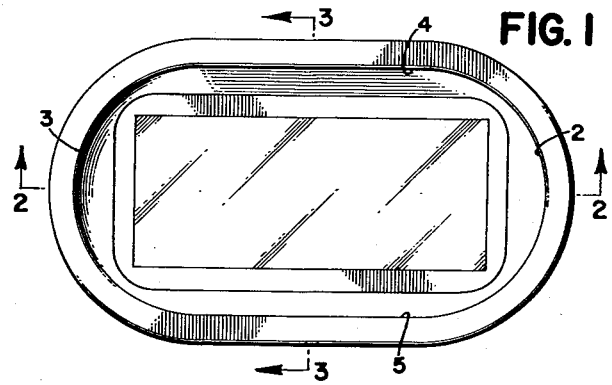
Figure 1 is a top plan view of the bathing device of the invention.

Referring now to the drawing, the device may assume various configurations. However, in the present instance, I provide a miniature container of tub-like appearance, in that a sloping sidewall 1 is provided, which side wall has rounded end portions 2 and 3 and straight parallel side wall portions 4 and 5. The side wall 1 is provided with a rim flange 6, upon which the bird may perch. The container is provided with a base 7 having an enlarged depressed portion 8. The depressed portion is adapted to receive a reflector 9, which may be a mirror, so treated as to be waterproof on its silvered surface. The outer surface of the reflector is flush with the surface of the encircling base portion 10, which frames the reflector. In place of using a mirror of glass, I may provide a metallic member which has a reflector surface, or the inner surface of the base may be directly treated so as to afford a reflecting surface.

Figure 2:
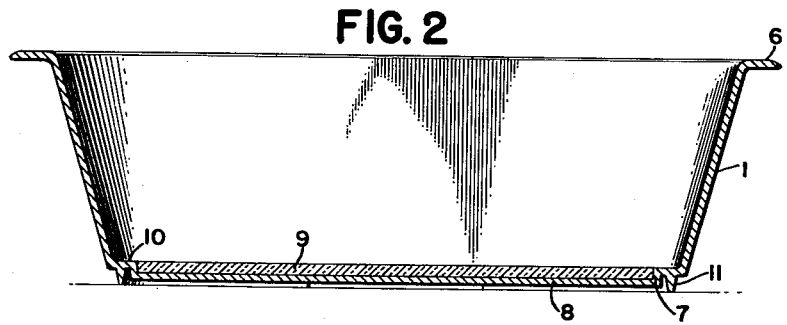
Figure 2 is a sectional view on the line 2—2 of Figure 1, and on an enlarged scale, and, Figure 3 is a sectional view on the line 3—3 of Figure 1 on an enlarged scale.
Figure 3:
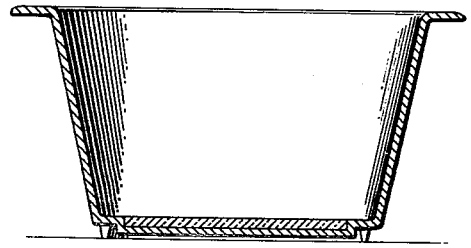

As shown in Figures 2 and 3, a depending encircling flange 11 is provided to support the device on some object.

The operation, uses and advantages of the device are as follows:

It is a known fact that birds are curious and certain birds, such as parakeets, are vain and like to see their reflection. Whether the bird realizes that it is the reflection of itself or not is problematical. However, taking a parakeet as an example, a parakeet upon perching upon the flange 6 and gazing downwardly will see a reflection of itself on the base of the device, and in actual tests, the parakeet will leap from the flange 6 onto the reflecting surface and, as a rule, will start pecking at the surface. If the container is holding water to approximately half the height of the side wall 1, the parakeet will instinctively start sprucing its feathers in the water.

The present invention lends itself to ready manufacture from a plastic, although it may be made from any material desired.

I claim:

As a new article of manufacture, a bird bathing device, comprising a container having a base provided with a depressed portion, a mirror confined in said depressed portion, and a side wall surrounding the base.

References Cited in the file of this patent

UNITED STATES PATENTS

| | | |
|---|---|---|
| 253,539 | McLean | Feb. 14, 1882 |
| 2,606,522 | Harris | Aug. 12, 1952 |
| 2,717,577 | Petsche | Sept. 13, 1955 |